B. R. WATSON.
SAW HANDLE.
APPLICATION FILED JUNE 12, 1920.
1,414,608. Patented May 2, 1922.
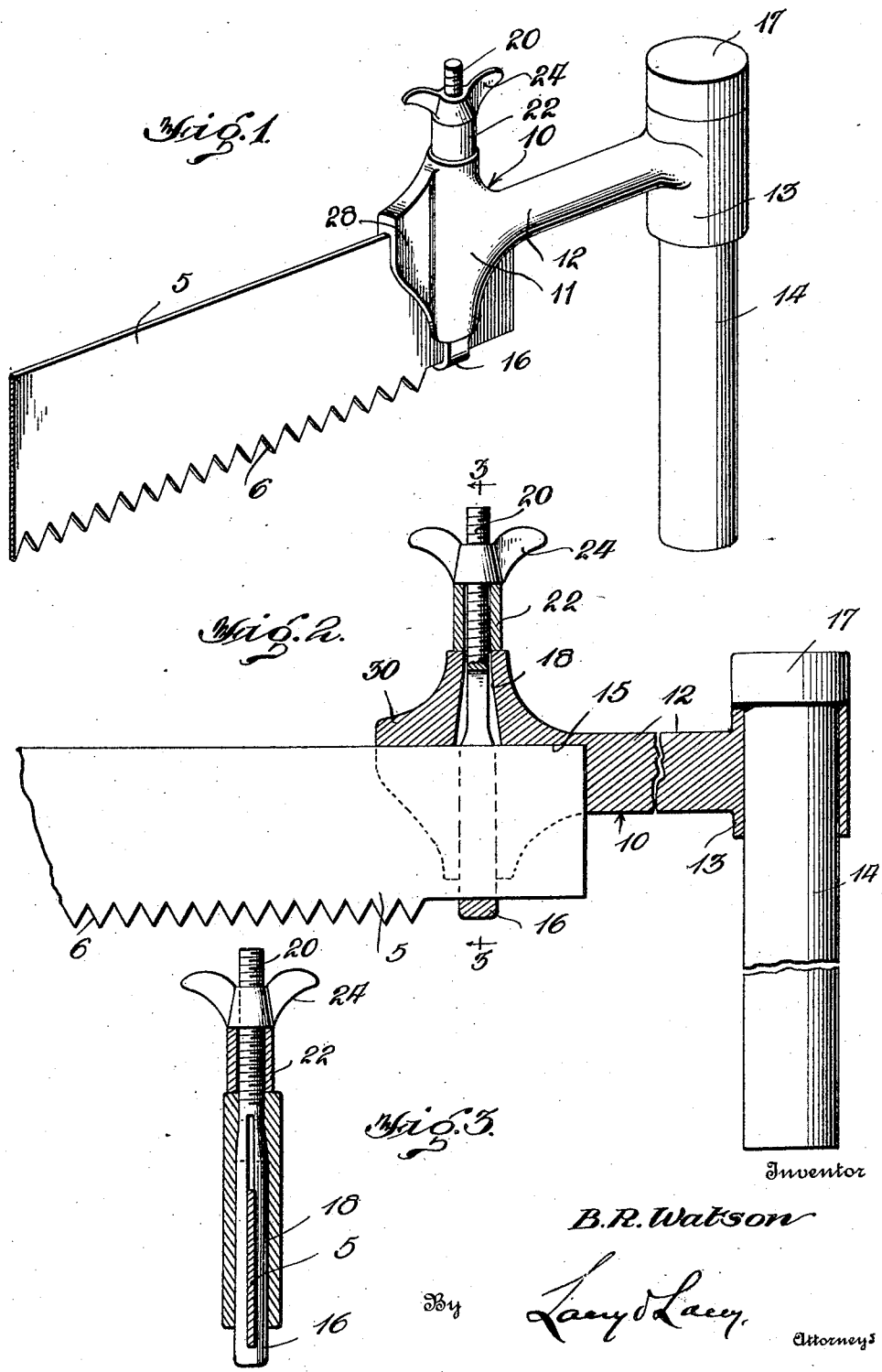

UNITED STATES PATENT OFFICE.

BAZEL R. WATSON, OF EVERETT, WASHINGTON.

SAW HANDLE.

1,414,608.  Specification of Letters Patent.  Patented May 2, 1922.

Application filed June 12, 1920. Serial No. 388,416.

*To all whom it may concern:*

Be it known that I, BAZEL R. WATSON, a citizen of the United States, residing at Everett, in the county of Snohomish and State of Washington, have invented certain new and useful Improvements in Saw Handles, of which the following is a specification.

This invention relates to improvements in saw handles especially adapted for use on felling saws.

An important object of this invention is to provide a saw handle having novel means to securely and firmly gripping a felling saw blade so that the continued use of the saw will not result in the loosening of the connection between the handle and the blade.

A further object of the invention is to provide a saw handle having a head provided with novel means for securely engaging the attaching loop of the same with a felling saw blade so that the blade will not be allowed to sever or cut the loop as the result of continued use of the saw.

A further object of the invention is to provide a saw handle having a head provided with a pair of forwarding projecting ears which are adapted to be arranged on opposite sides of and firmly in contact with a saw blade so as to brace the same and to form a projection or stop element to prevent the fastening means for the blade from engaging a tree upon being cut, so as to prevent the fastening device from becoming accidentally loosened.

The invention forming the subject matter of this invention also aims to provide a saw handle which may be easily applied, is durable in use and cheap to manufacture.

Other objects and advantages of the invention will be apparent during the course of the following description.

In the accompanying drawing forming a part of this application and in which like numerals are employed to designate like parts throughout the same, Figure 1 is a perspective view of the improved handle applied, Figure 2 is a central vertical longitudinal section through the same applied, Figure 3 is a vertical transverse section taken on the line 3—3 of Figure 2.

In the drawing, wherein for the purpose of illustration is shown the preferred embodiment of the invention, the numeral 5 generally designates a felling saw blade having a plurality of longitudinally extending teeth 6 along one edge portion thereof. The improved handle forming the subject matter of this application is generally designated by the numeral 10 and comprises a head 11 having a rearwardly extending shank 12 formed integral therewith. The shank carries a sleeve 13. As illustrated in Figure 1 of the drawing, a wooden handle 14 is detachably extended through the sleeve 13 and is provided with an enlarged head 17 which engages the upper side of the sleeve so as to limit the movement of the handle.

With particular reference to Figure 2, it will be observed that the head 11 and the adjacent portion of the rearwardly extending shank 12 are formed with a longitudinally extending slot 15 which snugly receives the adjacent end portion of the saw blade. A loop 16 of elongated formation is extended through a transverse opening 18 in the head and is provided with a screw threaded shank 20 on which a collar or washer 22 and a wing nut 24 are mounted. With particular reference to Figure 3, it will be observed that the side walls of the opening 18 are inclined inwardly in the direction of the upper end of the head so that as the loop 16 is drawn through the opening the sides of the loop will be pressed together by contact with the inwardly inclined walls of the opening. That is to say, as the loop 16 is drawn through the opening as the result of tightening up on the thumb screw 24, the sides of the loop are drawn inwardly into firm and rigid engagement with the sides of the saw blade so as to provide a secure connection between the loop and the saw blade. Also, as the loop 16 is drawn through the transverse opening 18 which intersects the slot 15, the upper longitudinal edge of the saw blade is drawn flatly into engagement with the upper wall of the slot 15 and the rear end of the blade is engaged with the rear end of the slot. As illustrated in Figure 3, the sides of the loop adjacent the shank converge slightly so that a wedging action is provided between the side walls of the opening 18 and the sides of the loop whereby the sides of the loop are flatly and firmly engaged with the saw blade.

The head 11 is provided with a pair of forwardly projecting spaced parallel ears or stop elements 28 which engage opposite sides of the saw blade so as to brace the same. With particular reference to Figure 2, it will be observed that the forwardly projecting ears 28 have their upper portions connected as indicated at 30 to provide a saddle bearing over the upper edge of the saw blade and that the ears extend beyond the vertical plane of the wing nut 24 so that the wing nut is prevented from engaging a tree and becoming loosened in its connection with the screw threaded shank 20. The connecting portion 30 of the forwardly projecting ears 28 cooperates with the upper wall of the slot 15 so as to limit the upward movement of the saw blade upon being secured to the head. It will be noted that the loop 15 is disposed between the ears and the shank 12 so that the loop may firmly and securely draw the upper longitudinal edge portion of the blade firmly into contact with the connecting portion 30 and the upper wall of the slot 15. The forward edges of the ears 28 curve to the lower end of the head to provide a pair of bearing lips contacting the saw blade throughout the major portion of its width and bracing the head at its forward side. Similarly, the line of the shank at the lower side thereof curves to the lower end of the head to provide a similar pair of bearing lips contacting the blade throughout the major portion of its width and bracing the head at its rear side, the bearing lips forming, of course, continuations of the walls of the slot 15.

In the manufacture of the improved handle, the same is preferably made of aluminum although it is obvious that other materials may be employed if found expedient.

In connecting the improved handle to a felling saw blade, it is merely necessary to extend one end portion of the blade within the slot 15 so that the rear end of the blade is engaged with the rear end of the slot and so that the upper longitudinal edge of the blade is engaged with the upper wall of the slot and with the connecting portion 30. The loop 16 is now drawn firmly into engagement with the blade by tightening up on the nut 24 so that as the loop is drawn upwardly the sides of the same will be drawn snugly into contact with the opposite sides of the blade. With the handle so adjusted, the same is not liable to become loosened as the result of continued use of the saw.

It is to be understood that the form of the invention herewith shown and described is to be taken as the preferred example of the same and that such minor changes in the arrangement and construction of parts may be made as will remain within the spirit of the invention and the scope of what is claimed.

Having thus described the invention, what is claimed as new is:

A device of the character described including a shank provided at one end with a sleeve to receive a handle and at its opposite end with a tubular head projecting above and below the shank and formed at its lower end portion with a diametric saw blade receiving slot extending axially of the shank in the rear of the head, the line of the shank at the lower side thereof sloping to the lower end of the head to define a pair of bearing lips bracing the projecting lower end of the head and providing a continuation of the walls of said slot to contact a saw blade in the rear of the head, ears projecting from the forward side of the head bracing the projecting upper end of the head and integrally joined at their upper ends to provide a saddle to bear over the upper edge of the saw blade, the forward edges of said ears sloping to the lower end of the head to provide a second pair of bearing lips bracing the projecting lower end of the head and forming a continuation of the walls of said slot to contact the saw blade at the forward side of the head, and a loop adjustable through the head for clamping the saw blade in said slot.

In testimony whereof I affix my signature.

BAZEL R. WATSON. [L. S.]